United States Patent
Craig et al.

(10) Patent No.: US 11,086,559 B2
(45) Date of Patent: Aug. 10, 2021

(54) CLOUD BASED STORE AND RESTORE WITH COPY SERVICES

(71) Applicant: INTERNATIONAL BUSINESS MACHINES CORPORATION, Armonk, NY (US)

(72) Inventors: Matthew R. Craig, Sahuarita, AZ (US); Edward H. Lin, Tucson, AZ (US); Beth A. Peterson, Tucson, AZ (US); Qiang Xie, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 596 days.

(21) Appl. No.: 15/695,832

(22) Filed: Sep. 5, 2017

(65) Prior Publication Data

US 2019/0073155 A1 Mar. 7, 2019

(51) Int. Cl.
*G06F 3/06* (2006.01)
*G06F 13/28* (2006.01)

(52) U.S. Cl.
CPC .......... *G06F 3/0655* (2013.01); *G06F 3/0604* (2013.01); *G06F 3/065* (2013.01); *G06F 3/067* (2013.01); *G06F 3/0638* (2013.01); *G06F 3/0664* (2013.01); *G06F 13/28* (2013.01); *G06F 3/061* (2013.01)

(58) Field of Classification Search
CPC .............................. G06F 3/0655; G06F 3/0638
See application file for complete search history.

(56) References Cited

U.S. PATENT DOCUMENTS

| 9,588,977 | B1 | 3/2017 | Wang et al. |
| 2007/0233981 | A1* | 10/2007 | Arakawa ............. G06F 11/2064 |
| | | | 711/162 |
| 2010/0332454 | A1* | 12/2010 | Prahlad ............... H04L 67/2852 |
| | | | 707/654 |
| 2013/0085989 | A1 | 4/2013 | Nayyar et al. |
| 2017/0041322 | A1 | 2/2017 | Kurian et al. |

(Continued)

FOREIGN PATENT DOCUMENTS

| CN | 103078907 A | 5/2013 |
| CN | 104813276 A | 7/2015 |
| WO | 2016196766 A2 | 12/2016 |

OTHER PUBLICATIONS

PCT International Search Report and Written Opinion dated Jan. 30, 2019, pp. 9, for Application Serial No. PCT/IB2018/056735 filed Sep. 4, 2018.

(Continued)

*Primary Examiner* — Emmanuel L Moise
*Assistant Examiner* — Xiang Yu
(74) *Attorney, Agent, or Firm* — Konrad Raynes Davda & Victor LLP; Janaki K. Davda

(57) ABSTRACT

Provided are techniques for cloud based store and restore with copy services. A store command to transfer data from one or more tracks of a volume to cloud storage is received. With track services, data for the one or more tracks in the volume is retrieved by emulating a host read. With a cloud data movement engine, the data for the one or more tracks is converted to data for one or more objects. With the cloud data movement engine, the one or more objects are stored in the cloud storage.

24 Claims, 11 Drawing Sheets

(56) References Cited

U.S. PATENT DOCUMENTS

2017/0075907 A1    3/2017  Goswami et al.
2019/0272260 A1*   9/2019  Kinney, Jr. ......... G06F 16/1873

OTHER PUBLICATIONS

English language translation of CN103078907 dated May 1, 2013, pp. 27.
English language translation of CN104813276 dated Jul. 29, 2015, pp. 38.

* cited by examiner

CLOUD BASED STORE AND RESTORE WITH COPY SERVICES

BACKGROUND

1. Field of the Invention

Embodiments of the invention relate to cloud based store and restore with copy services.

2. Description of the Related Art

A storage controller manages physical disk drives (and/or other storage, such as flash drives) and presents them to a host computer as logical units. A cloud data movement engine at the storage controller allows for a server-less direct data transfer from the storage controller to cloud storage (i.e., object storage). This technology saves Millions of Instructions Per Second (MIPS) by bypassing the host computer and resolving inefficiencies with tape storage.

The cloud data movement engine has been used against simplex volumes, primarily in test and development, simplex environments as a way to allow customers to start looking at cloud storage and its advantages in a Hierarchical Storage Management (HSM) archive environment, which moves data between storage media.

In conventional versions, the cloud data movement engine uses a device adapter directly for store commands (to store data from the storage controller into cloud storage) and restore commands (to restore data from the cloud storage to the storage controller). This bypasses integration with copy services, and, therefore, is incompatible with various disaster recovery and high availability solutions.

For example, in conventional versions of the cloud data movement engine, when data is recalled from object storage, the storage controller directly transfers the data from the cloud storage to a device adapter, which is connected to the physical disk drives. This technique bypasses the cache. Consequently, it is important to ensure that the cache does not overlay the cloud data movement engine changes with residual data and that the track related metadata is appropriately updated. For example, once the cloud data movement engine writes a full track into a device adapter buffer, the device adapter then destages the data from the device adapter buffer to a physical disk drive.

Thus, there is a need for improved cloud based store and restore that integrates with copy services.

SUMMARY

In a first embodiment, provided is a computer program product for cloud based store and restore with copy services. The computer program product comprises a computer readable storage medium having program code embodied therewith, the program code executable by at least one processor to perform: receiving a store command to transfer data from one or more tracks of a volume to cloud storage; retrieving, with track services, data for the one or more tracks in the volume by emulating a host read; converting, with a cloud data movement engine, the data for the one or more tracks to data for one or more objects; and storing, with the cloud data movement engine, the one or more objects in the cloud storage.

In a second embodiment, provided is a computer system for cloud based store and restore with copy services. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving a store command to transfer data from one or more tracks of a volume to cloud storage; retrieving, with track services, data for the one or more tracks in the volume by emulating a host read; converting, with a cloud data movement engine, the data for the one or more tracks to data for one or more objects; and storing, with the cloud data movement engine, the one or more objects in the cloud storage.

In a third embodiment, provided is a method for cloud based store and restore with copy services. The method comprises: receiving, using a processor of a computer, a store command to transfer data from one or more tracks of a volume to cloud storage; retrieving, with track services, data for the one or more tracks in the volume by emulating a host read; converting, with a cloud data movement engine, the data for the one or more tracks to data for one or more objects; and storing, with the cloud data movement engine, the one or more objects in the cloud storage.

These first, second, and third embodiments enable cloud based store to be supported with copy services protections, while also allowing emulation of a host read. Moreover, these embodiments enable interaction of the cloud data movement engine and track services to process the store command.

In a fourth embodiment, the store command is received from a host and identifies the one or more tracks of the volume. Thus, the store command is a specific type of command that allows the host to identify the one or more tracks and the volume.

In a fifth embodiment, a restore command to transfer the data from the one or more objects to specified one or more tracks of a specified volume is received; with the cloud data movement engine, the data for the one or more objects is retrieved; with the cloud data movement engine, the data for the one or more objects to data for the specified one or more tracks is converted; and, with the track services, the data is written for the specified one or more tracks into the specified volume by emulating a host write. This embodiment enables cloud based restore to be supported with copy services protections, while also allowing emulation of a host write. Moreover, this embodiment enables interaction of the cloud data movement engine and track services to process the restore command.

In a sixth embodiment, the restore command is received from a host and identifies the one or more objects and specifies the one or more tracks of the volume for storing the data from the one or more objects. Thus, the restore command is a specific type of command that allows the host to identify the one or more objects in the cloud storage.

In a seventh embodiment, a storage controller includes the cloud data movement engine and the track services, and the storage controller is coupled to a cloud network that includes the cloud storage. This provides an enhanced architecture to allow the cloud data movement engine and track services to execute within the storage controller and work together to store data from the storage controller into the cloud storage and retrieve data from the cloud storage to the storage controller.

In an eighth embodiment, the data is converted between one format for the one or more tracks and another format for the one or more objects. This allows data to be stored in different formats in the one or more tracks and in the one or more objects.

In a ninth embodiment, the track services stores the data from the one or more tracks into a track services buffer, and wherein the cloud data movement engine stores the data from the one or more objects into a cloud data movement engine buffer. This allows for efficient user of buffers.

In a tenth embodiment, a storage controller includes the cloud data movement engine and the track services and is part of a cloud computing environment, and wherein a Software as a Service (SaaS) is configured to perform computer program product operations. This allows for the cloud data movement engine and the track services to execute in the storage controller in a cloud computing environment and provide processing of the store and restore as a service.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments build on the cloud data movement engine and Fibre Connection/High Performance FICON (e.g., FICON/HPF) Input/Output (I/O). Embodiments provide a new cloud data movement engine with Copy Services protections. For example, copy services meet governmental or other regulations and requirements for redundancy.

Copy Services may be described as operations for copying data from one storage to another storage. Such copying replicates data for disaster recovery, high availability of the data, mirroring of data, backup of data, etc. Traditional I/O integrates with Copy Services in the track access timeframe, allowing Copy Services to intercept a write to move that track to the target device via Fiber Channel and perform any necessary actions for duplication. Embodiments integrate with Copy Services for both read and write requests. Examples of copy services include an IBM® FlashCopy® service, an IBM® Metro Mirror® copy service, and an IBM® Global Mirror® copy service. (IBM, FlashCopy, Metro Mirror, and Global Mirror are registered trademarks or common law marks of International Business Machines Corporation in the United States and/or other countries.)

In conventional systems, because of the bypassing of cache and the normal host type write applications to do a write, Copy Services (CS) is not a part of the cloud data movement engine solution. However, embodiments advantageously provide a new cloud data transmission technique that can participate in various Copy Services capabilities.

Many production environments have some sort of copy services/replication enabled. Embodiments advantageously provide customer value by allowing the cloud data movement engine to be used in those environments for protections of other Copy Services.

Figure 1:
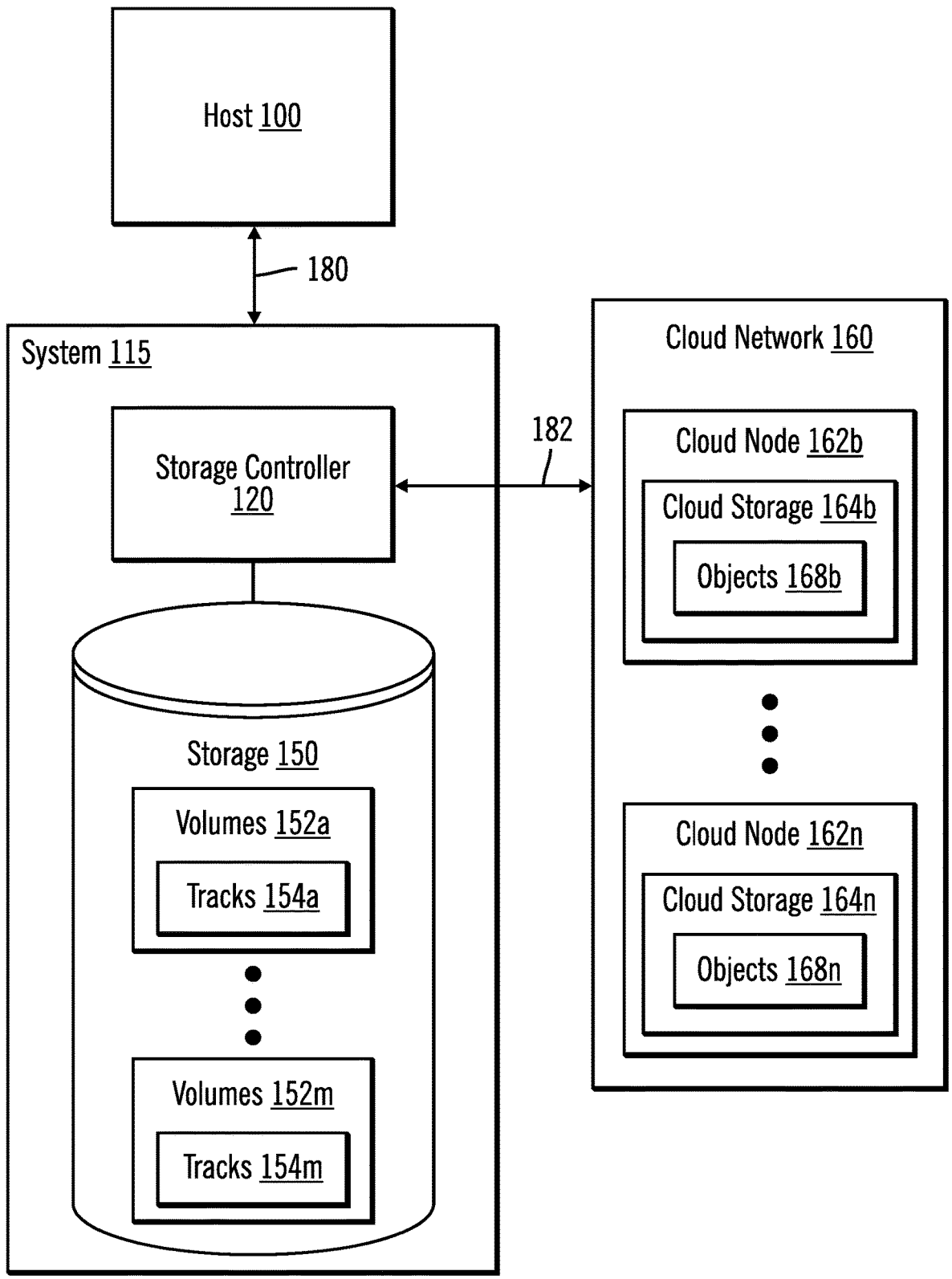
FIG. 1 illustrates, in a block diagram, a computing environment with a storage controller in accordance with certain embodiments.

FIG. 1 illustrates, in a block diagram, a computing environment with a storage controller 120 in accordance with certain embodiments. A host 100 is coupled to the storage controller 120 of a system 115. The storage controller 120 is coupled to storage 150. The storage controller 120 is also coupled to a cloud network 160.

The storage 150 stores volumes 152a . . . 152m. The volumes 152a . . . 152m store tracks 154a . . . 154m, respectively. The volumes 152a . . . 152m may be, for example, Logical Unit Numbers, Logical Devices, Logical Subsystems, etc. The storage 150 may be storage drives. In certain embodiments, the storage 150 may be comprised of one or more sequential access storage devices, such as hard disk drives and magnetic tape or may include non-sequential access storage devices, such as Solid State Drives (SSDs), for example. The storage 150 may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The cloud network 160 includes cloud nodes 162b . . . 162n, which include cloud storage 164b . . . 164n, respectively. The cloud storage 164b . . . 164n store objects 168b . . . 168n. In certain embodiments, the cloud storage 164b . . . 164n may be comprised of one or more sequential access storage devices, such as hard disk drives and magnetic tape or may include non-sequential access storage devices, such as Solid State Drives (SSDs), for example. The cloud storage 164b . . . 164n may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The host 100 may submit Input/Output (I/O) requests to the storage controller 120 over the network to access data (of tracks) in volumes 152a . . . 152m in storage 150 or data (of objects) in cloud storage 164b . . . 164n. The host 100 issues a store command to the storage controller 120 to transfer data from a volume 152a . . . 152m into cloud storage 164*b* . . . 164*n*. The host 100 issues a restore command to the storage controller 120 to retrieve (restore) the data from the cloud storage 164*b* . . . 164*n* into the volume 152*a* . . . 152*m*.

The system components 100, 120, 150, 160 are connected via communication paths 180, 182 that enable communication among these components. Thus, the communication path 180 between host 100 and system 115 and the communication path 182 between system 115 and cloud network 160 each include a fabric that may comprise a Storage Area Network (SAN), Local Area Network (LAN), Intranet, the Internet, Wide Area Network (WAN), peer-to-peer network, wireless network, arbitrated loop network, etc.

In certain embodiments, communication path 182 is Ethernet and communication path 180 is Fiber Channel. In other embodiments, the communication paths 180, 182 may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths 180, 182 includes instructions and other software controlling communication protocols and the operation of the communication hardware in accordance with the communication protocols, if any. It is appreciated that other communication path protocols may be utilized, depending upon the particular application.

Furthermore, as used herein, the term "unit of storage" or "storage unit" refers to a storage location containing one or more units of data storage capable of storing one or more data units such as one or more volumes, cylinders, tracks, segments, extents, or any portion thereof, or other unit or units of data suitable for transfer.

Figure 2:
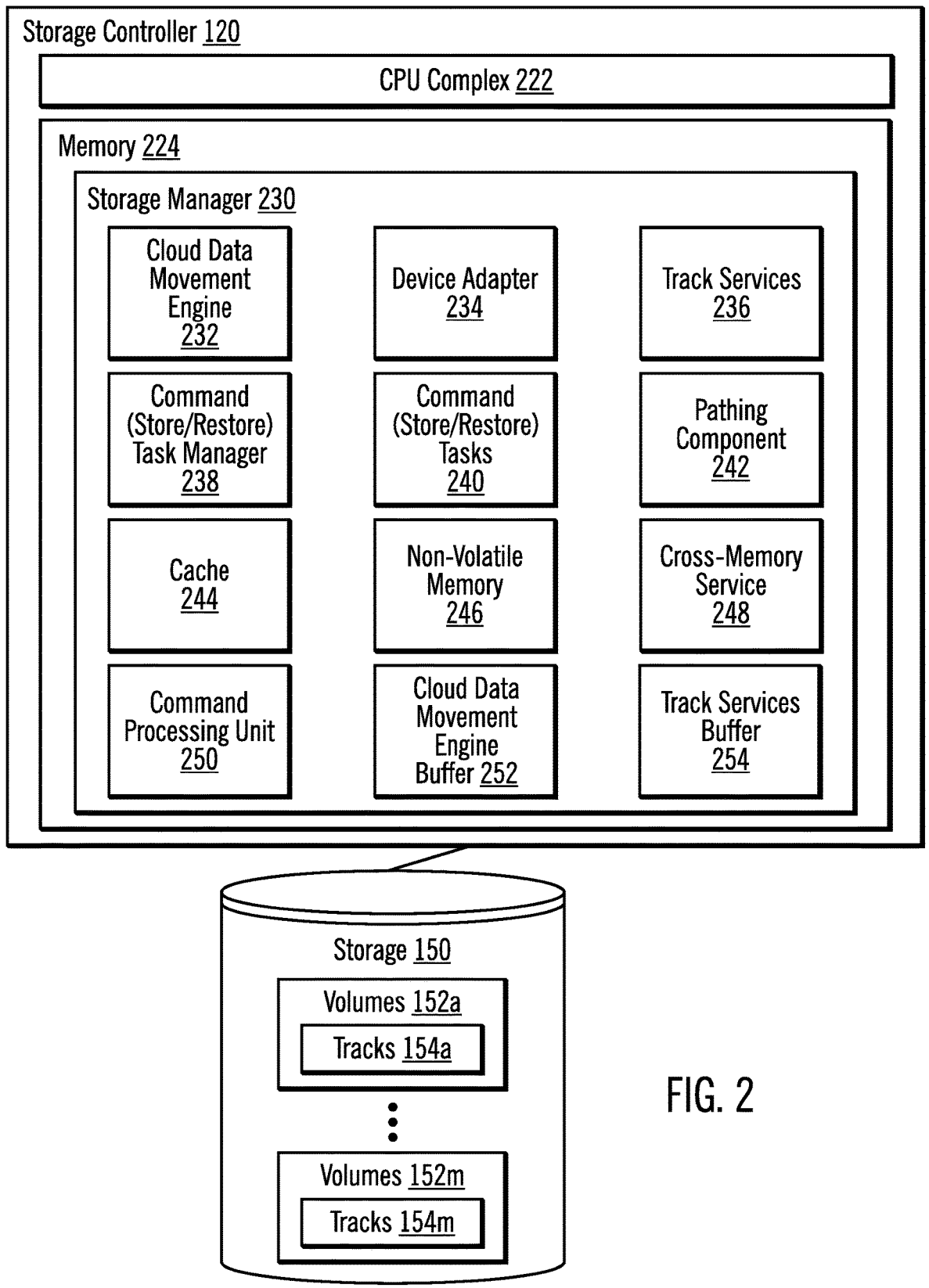
FIG. 2 illustrates, in a block diagram, further details of a storage controller in accordance with certain embodiments.

FIG. 2 illustrates, in a block diagram, further details of a storage controller 120 in accordance with certain embodiments. The storage controller 120 includes a Central Processing Unit (CPU) complex 222, including one or more processors or central processing units, each having a single or multiple processor cores. In certain embodiments, a processor core contains the components of a CPU involved in executing instructions, such as an Arithmetic Logic Unit (ALU), Floating Point Unit (FPU), and/or various levels of cache (such as L1 and L2 cache), for example. It is appreciated that a processor core may have other logic elements in addition to or instead of those mentioned herein.

Also, the storage controller 120 includes a memory 224 that includes a storage manager 230 for managing storage operations (e.g., to store data). The storage manager 230 includes a cloud data movement engine 232, a device adapter 234, track services 236, a command (store/restore) task manager 238, command (store/restore) tasks 240, a pathing component 242, a cache 244, non-volatile memory 246, a cross-memory service 248, a command processing unit 250, a cloud data movement engine buffer 252, and track services buffer 254. The command processing unit 250 processes the store and restore commands from the host 100 by using the cloud data movement engine 232 and the track services 236. In certain embodiments, the cloud data movement engine 232 is an application.

Figure 3:
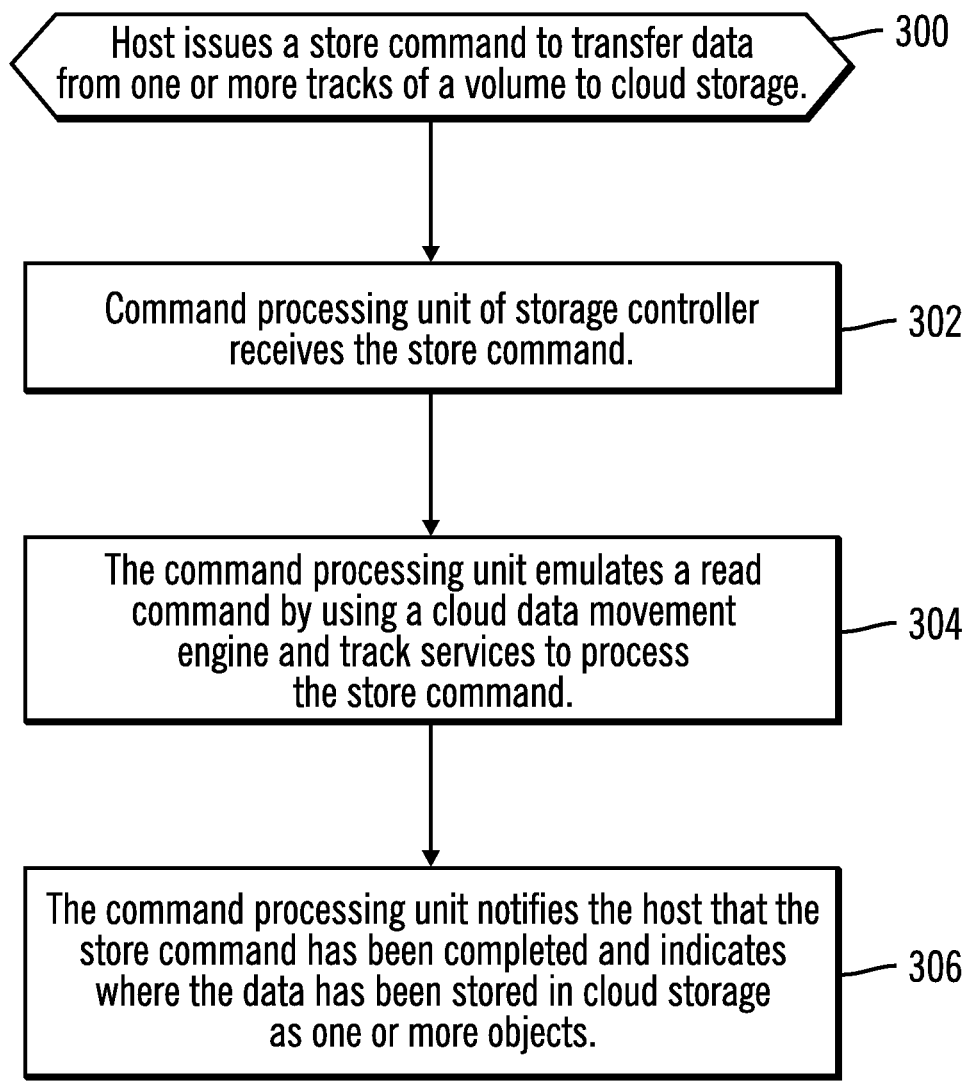
FIG. 3 illustrates, in a flow chart, processing of a store command in accordance with certain embodiments.

FIG. 3 illustrates, in a flow chart, processing of a store command in accordance with certain embodiments. Control begins at block 300 with the host 100 issuing a store command to transfer (store) data from one or more tracks of a volume 152*a* . . . 152*m* to the cloud storage 164*b* . . . 164*n*. With embodiments, the store command identifies a volume and the one or more tracks of data in that volume. The tracks of data may be identified as a range of tracks.

In block 302, the command processing unit 250 of the storage controller 120 receives the store command. In block 304, the command processing unit 250 emulates a read command ("host read") by using the cloud data movement engine 232 and the track services 236 to process the store command. In block 306, the command processing unit 250 notifies the host 100 that the store command has been completed and indicates where the data has been stored in cloud storage 164*b* . . . 164*n* as one or more objects 168*b* . . . 168*n*.

Figure 4A:
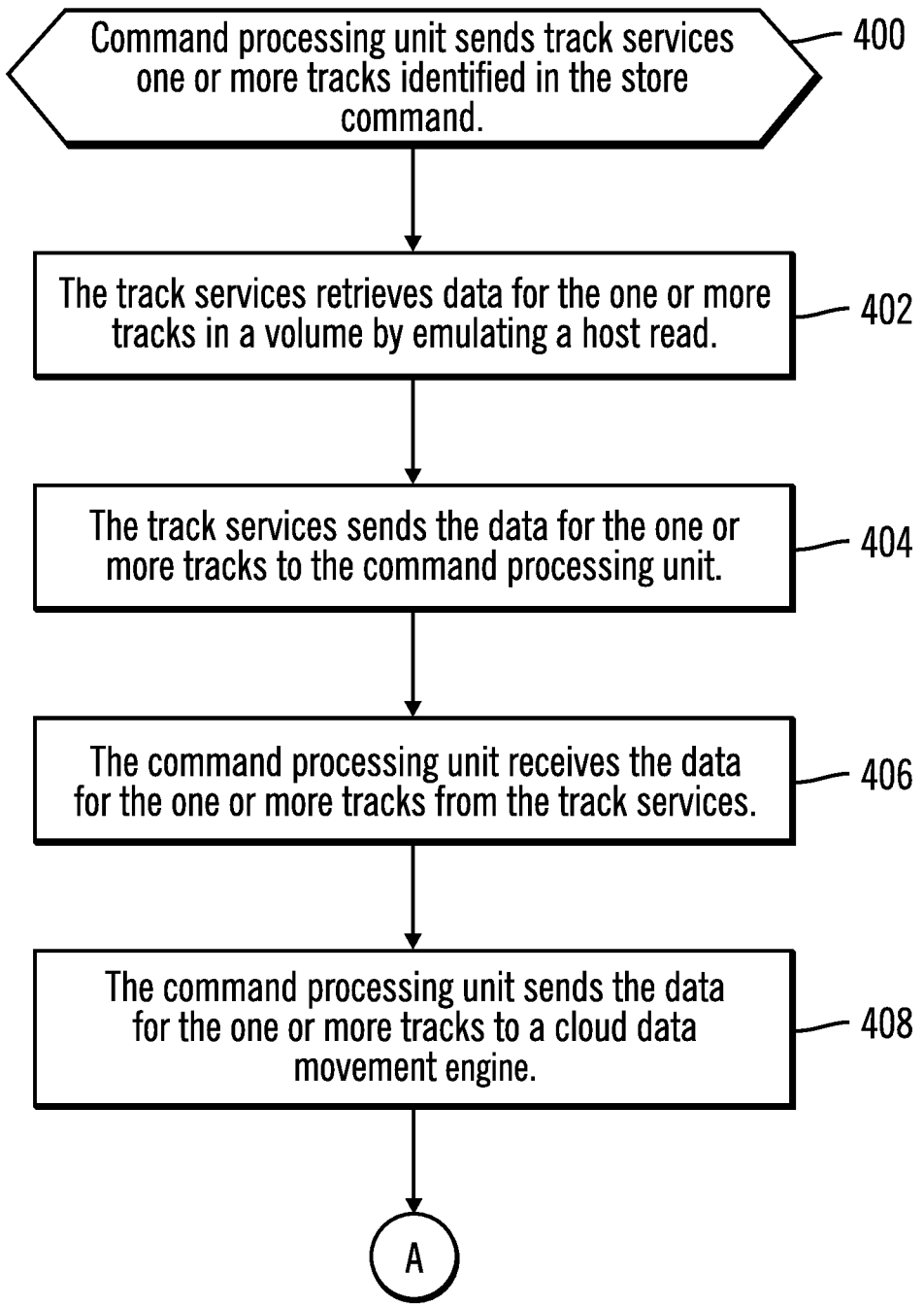
FIGS. 4A and 4B illustrate, in a flow chart, emulation of a host read to process a store command in accordance with certain embodiments.
Figure 4B:
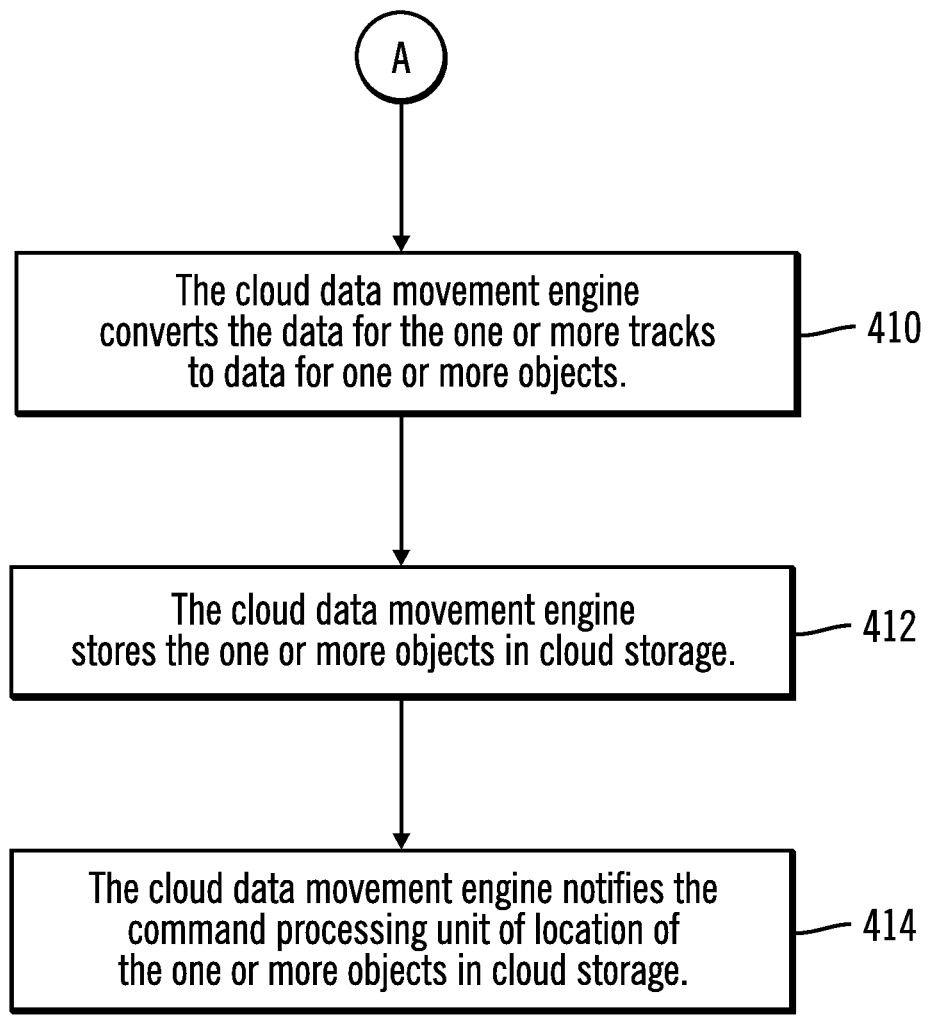

FIGS. 4A and 4B illustrate, in a flow chart, emulation of a host read to process a store command in accordance with certain embodiments. Control begins at block 400 with the command processing unit 250 sending the track services 236 one or more tracks identified in the store command. In block 402, the track services 236 retrieves data for the one or more tracks in the volume identified by the store command by emulating a host read. In block 404, the track services 236 sends the data for the one or more tracks to the command processing unit 250. With embodiments, the track services 236 may write the data to a track services buffer 254. In block 406, the command processing unit 250 receives the data for the one or more tracks from the track services 236. In block 408, the command processing unit 250 sends the data for the one or more tracks to the cloud data movement engine 232. From block 408 (FIG. 4A), processing continues to block 410 (FIG. 4B).

In block 410, the cloud data movement engine 232 converts the data for the one or more tracks to data for one or more objects. With embodiments, the data for a track may have a different format than data for an object. In block 412, the cloud data movement engine 232 stores the one or more objects in cloud storage 164*b* . . . 164*n*. In block 414, the cloud data movement engine 232 notifies the command processing unit 250 of the location of the one or more objects in cloud storage 164*b* . . . 164*n*.

Figure 5:
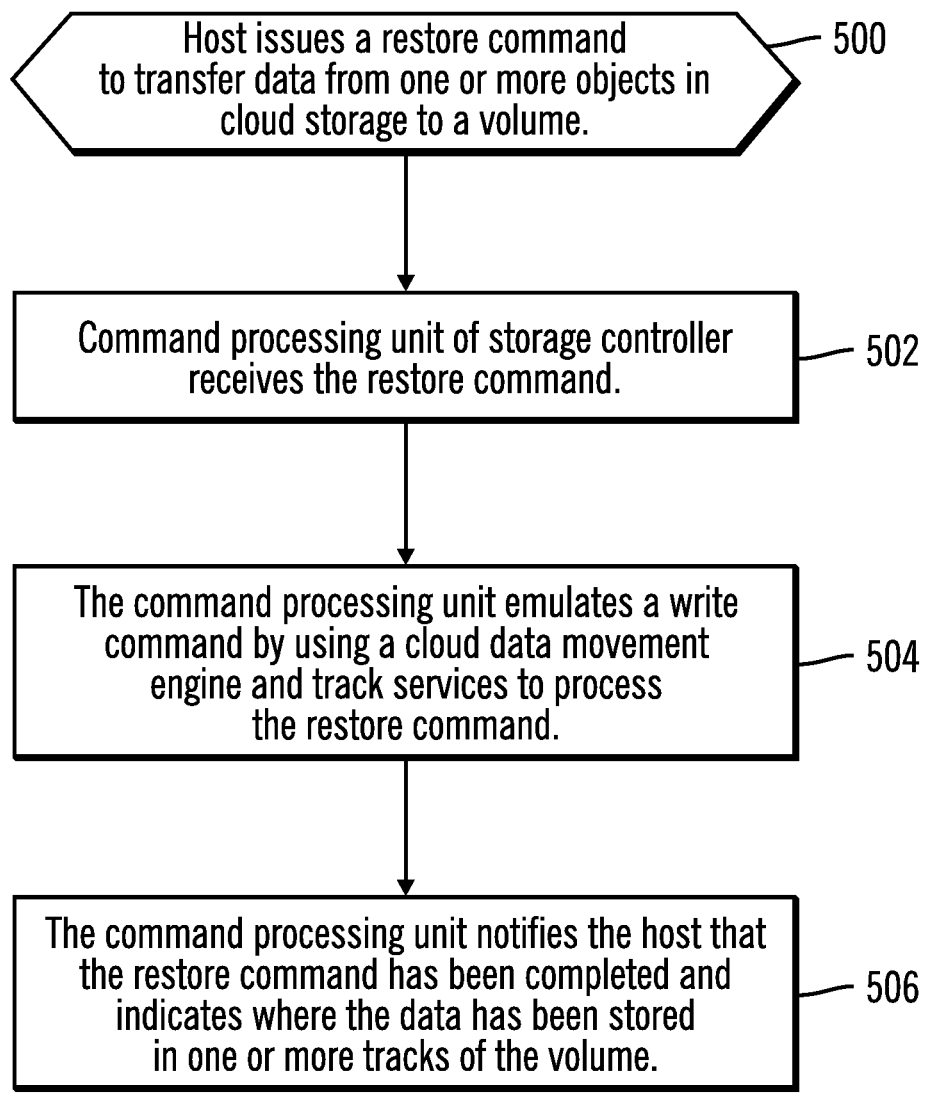
FIG. 5 illustrates, in a flow chart, processing of a restore command in accordance with certain embodiments.

FIG. 5 illustrates, in a flow chart, processing of a restore command in accordance with certain embodiments. Control begins at block 500 with the host 100 issuing a restore command to transfer (store) data from one or more objects in the cloud storage 164*b* . . . 164*n* to a volume 152*a* . . . 152*m*. With embodiments, the restore command identifies the one or more objects in the cloud storage 164*b* . . . 164*n* and one or more tracks of a volume 152*a* . . . 152*m* that will store data from the one or more objects.

In block 502, the command processing unit 250 of the storage controller 120 receives the restore command. In block 504, the command processing unit 250 emulates a write command by using the cloud data movement engine 232 and the track services 236 to process the restore command. In block 506, command processing unit 250 notifies the host that the restore command has been completed and indicates where the data has been stored in one or more tracks of a volume 152*a* . . . 152*m*.

Figure 6A:
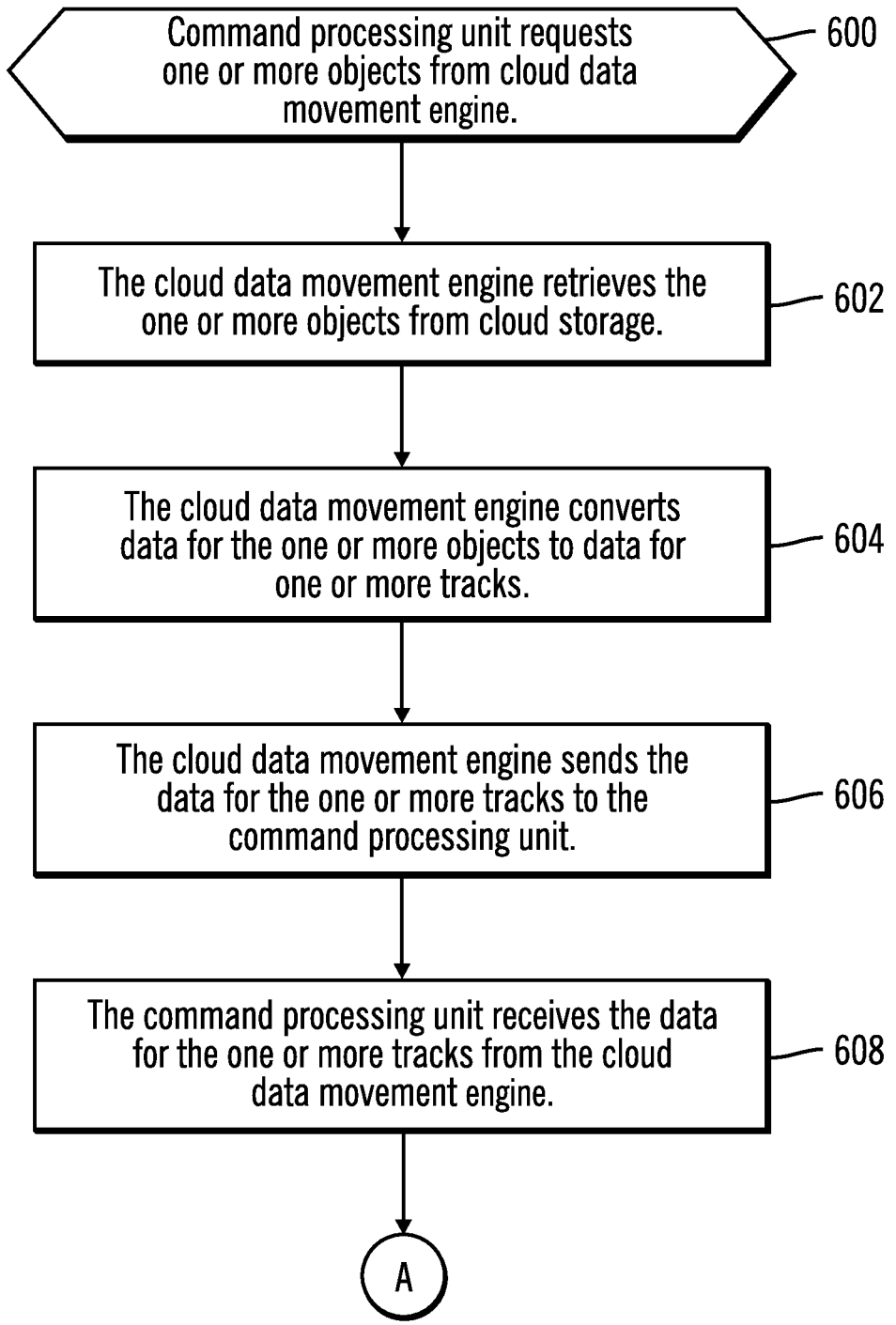
FIGS. 6A and 6B illustrate, in a flow chart, emulation of a host write to process a restore command in accordance with certain embodiments.
Figure 6B:
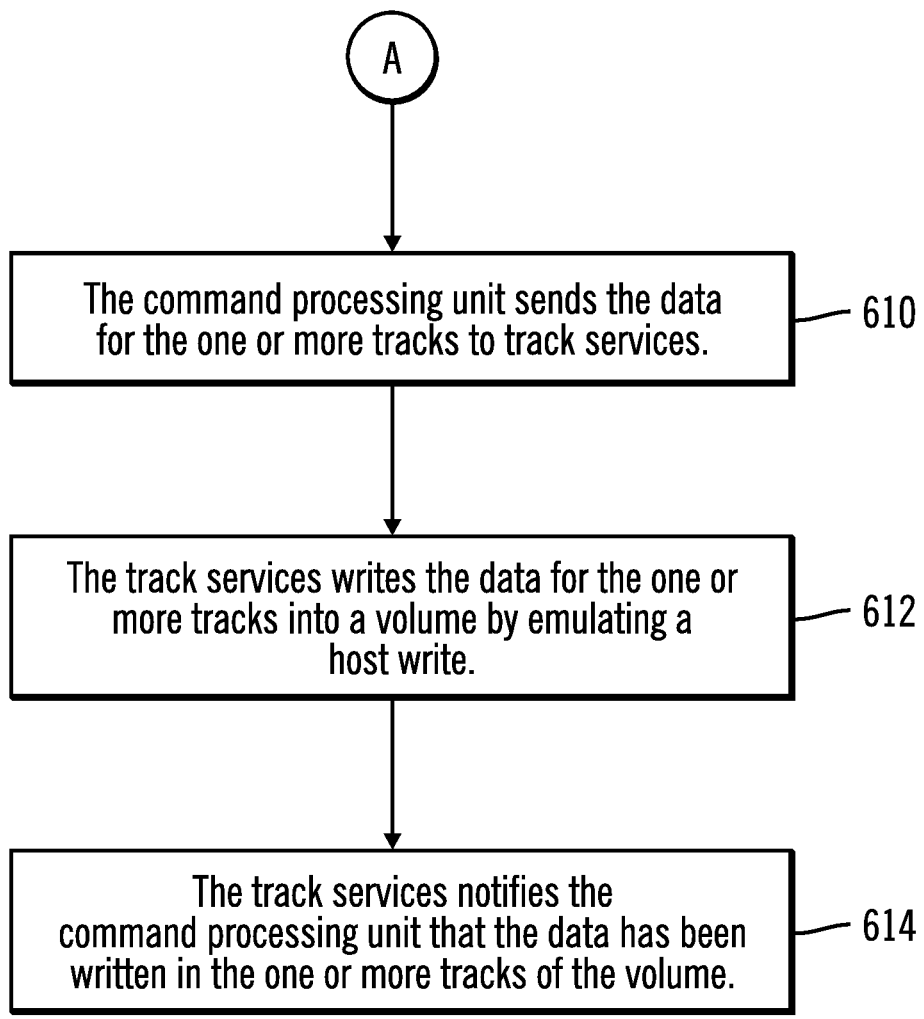

FIGS. 6A and 6B illustrate, in a flow chart, emulation of a host write to process a restore command in accordance with certain embodiments. Control begins at block 600 with the command processing unit 250 requesting the one or more objects identified in the restore command from the cloud data movement engine 232. In block 602, the cloud data movement engine 232 retrieves the one or more objects from the cloud storage 164b . . . 164n. In block 604, the cloud data movement engine 232 converts the data for the one or more objects to data for one or more tracks. In block 606, the cloud data movement engine 232 sends the data for the one or more tracks to the command processing unit 250. With embodiments, the cloud data movement engine 232 may write the data to a cloud data movement engine buffer 252. In block 608, the command processing unit 250 receives the data for the one or more tracks from the cloud data movement engine 232. From block 608 (FIG. 6A), processing continues to block 610 (FIG. 6B). In block 610, the command processing unit 250 sends the data for the one or more tracks to the track services 236. In block 612, the track services 236 writes the data for the one or more tracks into a volume 152a . . . 162m identified in the restore command by emulating a host write. In block 614, the track services notifies the command processing unit that the data has been written in the one or more tracks of the volume.

With embodiments, the data movement for a store command is volume 152a . . . 152m to device adapter 234 to track services buffer 254 to cloud data movement engine buffer 252 to cloud storage 164b . . . 164n. With embodiments, the data movement for a restore command is from cloud storage 164b . . . 164n to cloud data movement engine buffer 252 to track services buffer 254 to device adapter 234 to volume 152a . . . 152m.

Embodiments use a cross-memory service 248 to map the cloud data movement engine buffer 252 and the track services buffer 254. For example, to store data, embodiments read data from the volume 152a . . . 152m to the track services buffer 254, then the data is read from the cloud data movement engine buffer 252 directly.

Embodiments avoid using the device adapter 234 directly for store and restore commands. For example, with embodiments, for restore operations, instead of restoring directly into the device adapter 234 and to the volume, the cloud data movement engine 232 tunnels that restore command through the use of the track services 236 to emulate a host write (full track write), allowing for the restore operation to look like a write that came from the host 100. By emulating a host write, embodiments are able to take advantage of writing to cache using the track services 236 and, therefore, Copy Service functions which rely on the cache. For example, the track services 236 may write data into the cache 244.

With the cloud data movement engine 232, embodiments cover all forms of copy services, with very little copy services code integration or changes. In order to take advantage of host Input/Output (I/O) interfaces with copy services, embodiments provide a wrapper around the core command processing and track services management to emulate the host I/O. This wrapper allows the cloud data movement engine 232 code to communicate with track services 236 code and initiate a request for read or write processing. The read or write processing leverages aspects of the core command processing and the tracks services 236 management transparently. Because it is not host I/O, the host adapter hardware is not used. Once track access is obtained, the cloud data movement engine 232 is able to read or write entire tracks.

In certain embodiments, these are Count Key Data (CKD) tracks. CKD may be described as a data recording format for which cache 244 maintains metadata. Once the transfer is done, control is returned to the track services 236 to commit writes and release track access. Additional tracks may be processed in the same I/O request, In certain embodiments, the cloud data movement engine 232 invokes a command task manager 238 to give control to the track services 236. The command task manager 238 calls a new interface with a pathing component 242 to pass a read/write request to the track services 236. In certain embodiments, an emulated host type is used to represent the cloud data movement engine 232 as a request initiator. The request will emulate aspects of existing CKD architecture to package the request using the format of parameters as are used by the Prefix Read and Prefix commands to provide the new read/write command support. The track services 236 completes the read/write request and returns control to the cloud data movement engine 232. With embodiments, the cloud data movement engine 232 also emulates aspects of HPF write processing. In addition, embodiments recognize this as not originating directly from a host system and bypass any host-specific validation that does not apply to Cloud Services.

With embodiments, for store, data is read from cache first, and then the cloud data movement engine 232 reads the data via the cross-memory service 248. With embodiments, for restore, data restored from cloud storage is first written to the cloud data movement engine buffer 252, and then track services 236 gets access to the data via the cross-memory service 248 and writes the data from the track services buffer 254 to cache 244.

Embodiments allow the cloud data movement engine 232 and the track services 236 to work together to process store and restore commands. With embodiments, the cloud data movement engine 232 and the track services 236 share memory so that data does not need to be copied between them. With embodiments, the cloud data movement engine 232 and the track services 236 communicate via a pathing component 242.

The cloud data movement engine 232 read/write processes also emulate aspects of HPF read/write processing. For background, with HPF, the entirety of the CKD type chain is given to the storage controller 120 at the same time. This mechanism allowed for the encapsulation of a CKD type chain using a hybrid of FCP and FICON architecture. This single exchange encapsulation eliminates many of the channel/storage controller handshakes. It also provides the contents of the CKD type chain at start I/O (SIO) time, rather than in pieces associated with each individual command issuance.

With the rules between the operating system and the storage controller 120, the behavior was well-defined. Deviation from the expected behavior resulted in program or unit check. The encapsulation of a CKD type chain was done with a prefix command that specifies a number of read or write commands that will be done in a locate record domain. With embodiments, read/write type Channel Command Words (CCW) chains are included and not Perform Subsystem Function Control type chains. With embodiments, certain restrictions apply both in the allowable chains, data on the track, and internal processing in the storage controller 120.

This new type of I/O also encapsulates the read/write commands such that a single request contains all the information necessary for a set of reads or writes. The track services 236 uses this encapsulated request to provide the cloud data movement engine 232 access to the tracks of data in a volume 152a . . . 152m. Once the cloud data movement engine 232 has performed it's necessary transfers for store or restore commands, the track services 236 completes the work necessary to harden writes and release track access. Because the track services 236 follows the host I/O related rules and demands, the track services 236 provides strong protections for the data by emulating host I/O processing and all of the architectural behaviors associated with the CKD command set. In addition, the track services 236 also allows for copy services intercepts for a track access, which permit many disaster recovery techniques for these writes.

Thus, customers may use the cloud data movement engine 232 to take advantage of operating system MIPS reductions with full integration and interoperability with Copy Services for data protection and disaster recovery.

Thus, embodiments enable direct data transfer between volumes 152a . . . 152m and cloud storage 164b . . . 164n, encapsulating the commands similarly to the cloud data movement engine 232, but as a new interface that employs a command that encapsulates all of the information necessary for a set of reads and writes for the track services 236, and requests I/O processing so that the I/O processing appears like a host read or write to cache.

Embodiments store and retrieve from a storage controller 120 used as cloud storage. Embodiments perform copy services operations for disaster recovery when writing the volumes 152a . . . 152m of the storage controller 120 as part of the store function required for cloud storage 164b . . . 164n.

In certain embodiments, for emulating host I/O (read or write), a wrapper may be created for the same I/O work that is either host 100 initiated or cloud data movement engine 232 initiated. With embodiments, emulating host I/O is beneficial to leverage pre-existing architecture and, in effect, speak the same language between various interfaces and the storage controller 120 so that a lot of processing cycles are not used to translate the meaning. By using similar parameters as used for host I/O processing, embodiments easily understand what is necessary to process the request from an orientation perspective, to a track services perspective, to a cache technique perspective, to a copy services perspective, etc. This allows for tuning techniques to be leveraged. Also, it makes it transparent after the wrapper layer and allows the full benefit of the storage controller 120 processing and functionality already enjoyed by host I/O.

Additional Embodiment Details

The reference characters used herein, such as a, b, m, and n are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
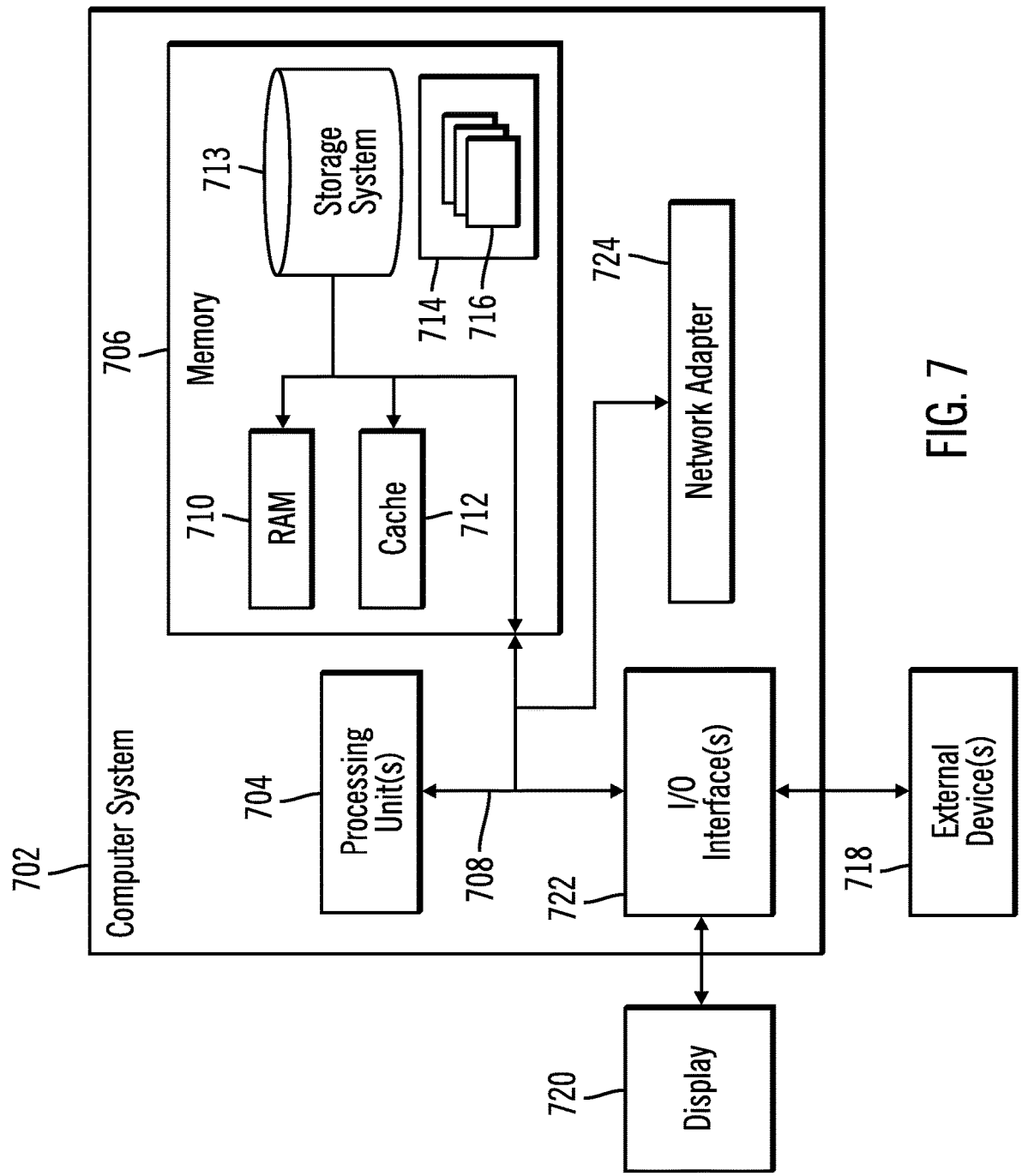
FIG. 7 illustrates a computing architecture in which the components of FIG. 1 may be implemented in accordance with certain embodiments.

FIG. 7 illustrates a computing architecture in which the components of FIG. 1 may be implemented in accordance with certain embodiments. The computational components of FIG. 1, including the host 100, storage controller 120, and cloud nodes 162b . . . 162n may implement computer architecture of computer system/server 702. However, computer node 702 is only one example of a suitable computer architecture and is not intended to suggest any limitation as to the scope of use or functionality of embodiments of the invention described herein. Regardless, computer system/server 702 is capable of being implemented and/or performing any of the functionality set forth hereinabove.

Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 711 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where, if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
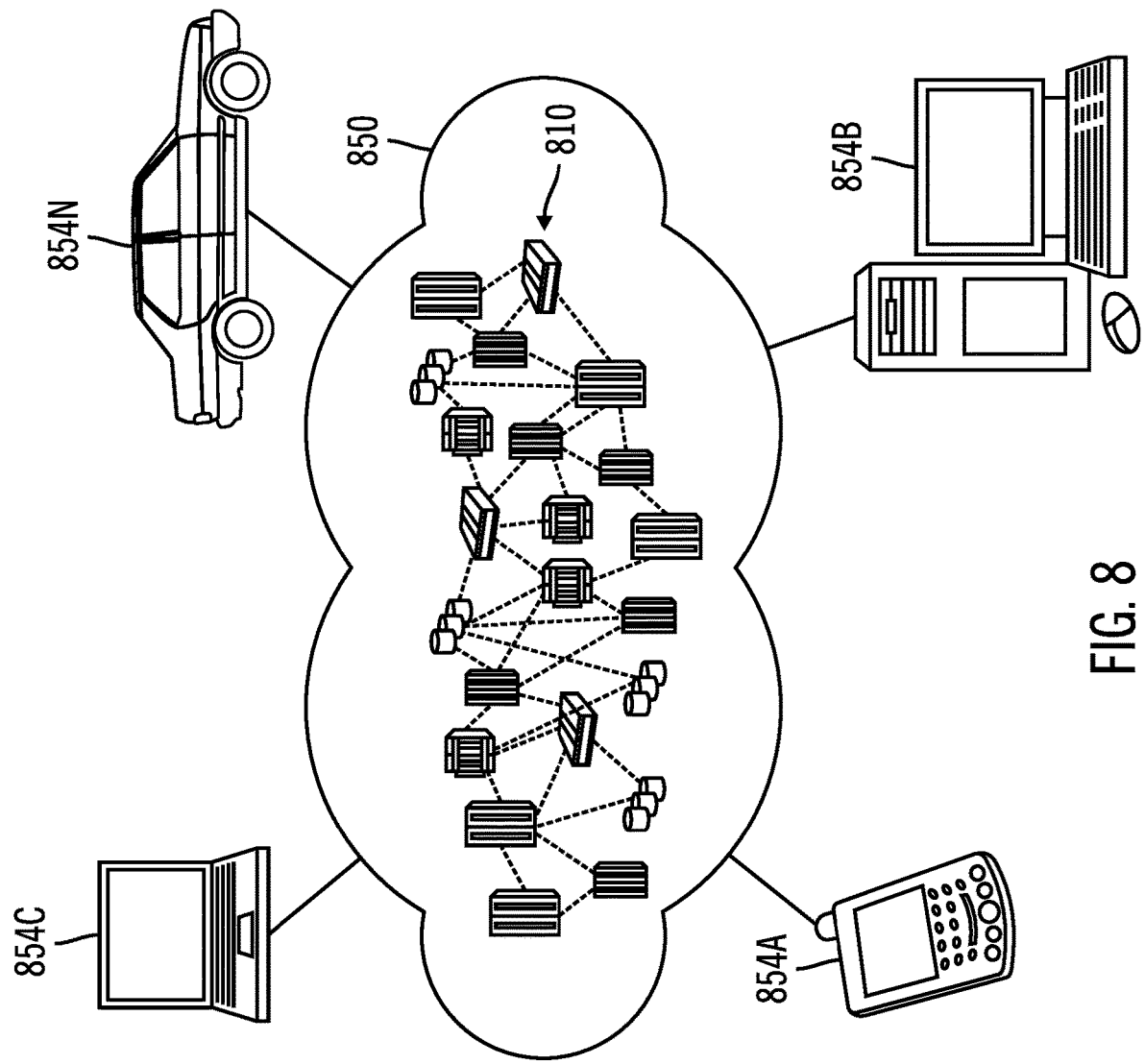
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
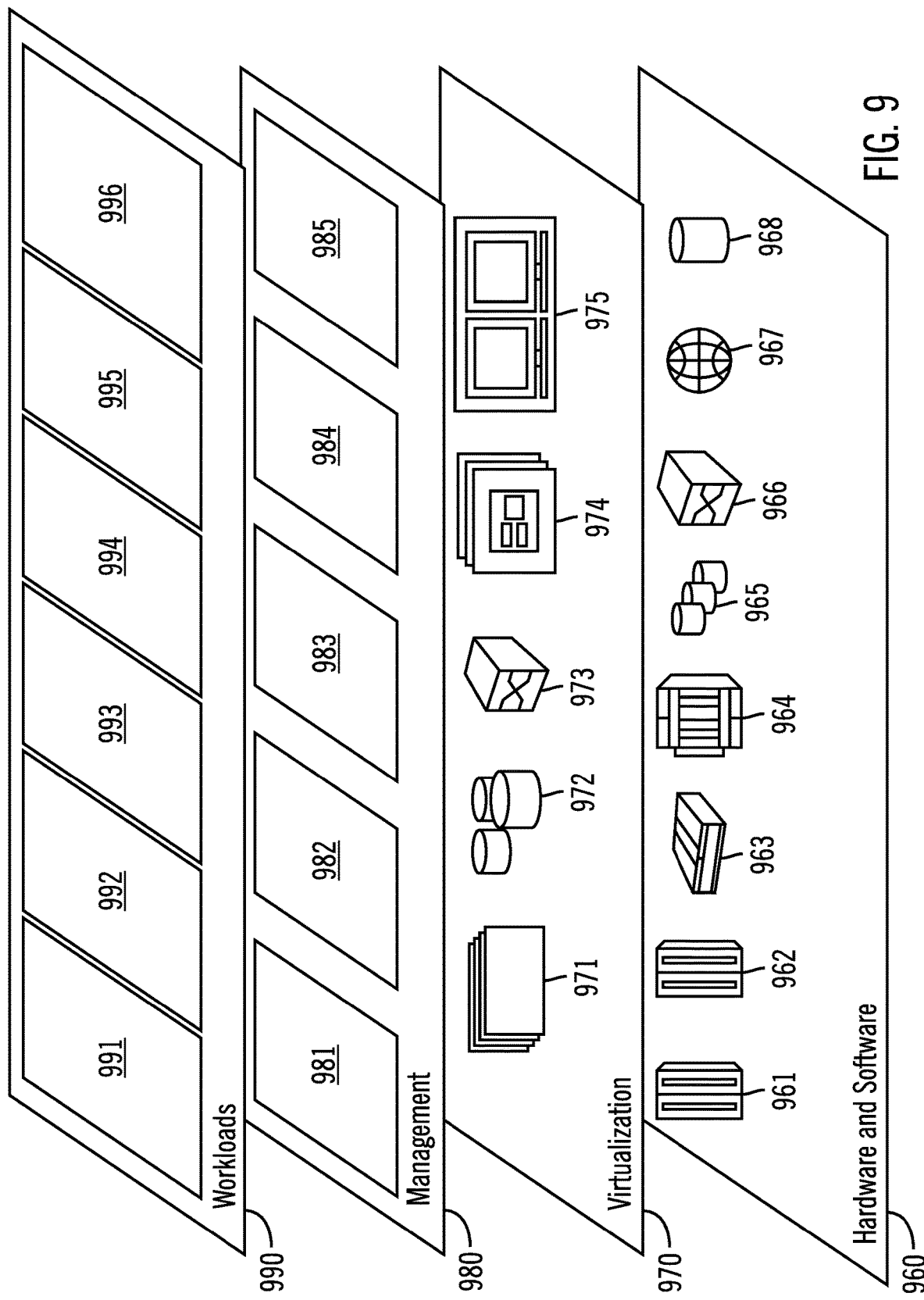
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and cloud based store and restore with copy services.

Thus, in certain embodiments, software or a program, implementing cloud based store and restore with copy services in accordance with embodiments described herein, is provided as a service in a cloud infrastructure.

In certain embodiments, the components of FIG. 1 are part of a cloud infrastructure. In other embodiments, the components of FIG. 1 are not part of a cloud infrastructure.

The cloud network 160 may be implemented in the manner described with reference to FIGS. 8 and 9.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
   receiving a store command to transfer data from one or more tracks of a volume to cloud storage; and
   in response to receiving the store command, processing the store command using track services, copy services, and a cloud data movement engine of a storage manager by:
      retrieving, with the track services, data for the one or more tracks of the volume by emulating a host read;
      writing, with the track services, the data for the one or more tracks to a track services buffer;
      copying, with the copy services, the data for the one or more tracks to another storage for duplication;
      retrieving, with the cloud data movement engine, the data from a cloud data movement engine buffer that is mapped to the track services buffer;
      converting, with the cloud data movement engine, the data for the one or more tracks in one format to data for one or more objects in another format; and
      storing, with the cloud data movement engine, the one or more objects in the cloud storage.

2. The computer program product of claim 1, wherein the store command is received from a host and identifies the one or more tracks of the volume.

3. The computer program product of claim 1, wherein the program code is executable by at least one processor to perform:
   receiving a restore command to transfer the data from the one or more objects to specified one or more tracks of a specified volume;

retrieving, with the cloud data movement engine, the data for the one or more objects;

converting, with the cloud data movement engine, the data for the one or more objects to data for the specified one or more tracks; and writing, with the track services, the data for the specified one or more tracks into the specified volume by emulating a host write.

4. The computer program product of claim 3, wherein the restore command is received from a host and identifies the one or more objects and specifies the one or more tracks of the volume for storing the data from the one or more objects.

5. The computer program product of claim 1, wherein a storage controller includes the cloud data movement engine and the track services, and wherein the storage controller is coupled to a cloud network that includes the cloud storage.

6. The computer program product of claim 1, wherein the cloud data movement engine stores the data from the one or more objects into the cloud data movement engine buffer.

7. The computer program product of claim 1, wherein a storage controller includes the cloud data movement engine and the track services and is part of a cloud computing environment, and wherein a Software as a Service (SaaS) is configured to perform computer program product operations.

8. The computer program product of claim 1, wherein the data from the track services buffer is read using a cross-memory service that maps the track services buffer and the cloud data movement engine buffer.

9. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
receiving a store command to transfer data from one or more tracks of a volume to cloud storage; and
in response to receiving the store command, processing the store command using track services, copy services, and a cloud data movement engine of a storage manager by:
retrieving, with the track services, data for the one or more tracks of the volume by emulating a host read;
writing, with the track services, the data for the one or more tracks to a track services buffer;
copying, with the copy services, the data for the one or more tracks to another storage for duplication;
retrieving, with the cloud data movement engine, the data from a cloud data movement engine buffer that is mapped to the track services buffer;
converting, with the cloud data movement engine, the data for the one or more tracks in one format to data for one or more objects in another format; and
storing, with the cloud data movement engine, the one or more objects in the cloud storage.

10. The computer system of claim 9, wherein the store command is received from a host and identifies the one or more tracks of the volume.

11. The computer system of claim 9, wherein the operations further comprise:
receiving a restore command to transfer the data from the one or more objects to specified one or more tracks of a specified volume;
retrieving, with the cloud data movement engine, the data for the one or more objects;
converting, with the cloud data movement engine, the data for the one or more objects to data for the specified one or more tracks; and
writing, with the track services, the data for the specified one or more tracks into the specified volume by emulating a host write.

12. The computer system of claim 11, wherein the restore command is received from a host and identifies the one or more objects and specifies the one or more tracks of the volume for storing the data from the one or more objects.

13. The computer system of claim 9, wherein a storage controller includes the cloud data movement engine and the track services, and wherein the storage controller is coupled to a cloud network that includes the cloud storage.

14. The computer system of claim 9, and wherein the cloud data movement engine stores the data from the one or more objects into the cloud data movement engine buffer.

15. The computer system of claim 9, wherein a storage controller includes the cloud data movement engine and the track services and is part of a cloud computing environment, and wherein a Software as a Service (SaaS) is configured to perform computer system operations.

16. The computer system of claim 9, wherein the data from the track services buffer is read using a cross-memory service that maps the track services buffer and the cloud data movement engine buffer.

17. A computer-implemented method, comprising:
receiving, using a processor of a computer, a store command to transfer data from one or more tracks of a volume to cloud storage; and
in response to receiving the store command, processing the store command using track services, copy services, and a cloud data movement engine of a storage manager by:
retrieving, with the track services, data for the one or more tracks of the volume by emulating a host read;
writing, with the track services, the data for the one or more tracks to a track services buffer;
copying, with the copy services, the data for the one or more tracks to another storage for duplication;
retrieving, with the cloud data movement engine, the data from a cloud data movement engine buffer that is mapped to the track services buffer;
converting, with the cloud data movement engine, the data for the one or more tracks in one format to data for one or more objects in another format; and
storing, with the cloud data movement engine, the one or more objects in the cloud storage.

18. The computer-implemented method of claim 17, wherein the store command is received from a host and identifies the one or more tracks of the volume.

19. The computer-implemented method of claim 17, further comprising:
receiving a restore command to transfer the data from the one or more objects to specified one or more tracks of a specified volume;
retrieving, with the cloud data movement engine, the data for the one or more objects;
converting, with the cloud data movement engine, the data for the one or more objects to data for the specified one or more tracks; and
writing, with the track services, the data for the specified one or more tracks into the specified volume by emulating a host write.

20. The computer-implemented method of claim 19, wherein the restore command is received from a host and identifies the one or more objects and specifies the one or more tracks of the volume for storing the data from the one or more objects.

21. The computer-implemented method of claim 17, wherein a storage controller includes the cloud data movement engine and the track services, and wherein the storage controller is coupled to a cloud network that includes the cloud storage.

22. The computer-implemented method of claim 17, and wherein the cloud data movement engine stores the data from the one or more objects into the cloud data movement engine buffer.

23. The computer-implemented method of claim 17, wherein a storage controller includes the cloud data movement engine and the track services and is part of a cloud computing environment, and wherein a Software as a Service (SaaS) is configured to perform method operations.

24. The computer-implemented method of claim 17, wherein the data from the track services buffer is read using a cross-memory service that maps the track services buffer and the cloud data movement engine buffer.

* * * * *